US009866640B2

(12) United States Patent
Motukuru et al.

(10) Patent No.: US 9,866,640 B2
(45) Date of Patent: Jan. 9, 2018

(54) COOKIE BASED SESSION MANAGEMENT

(71) Applicant: Oracle International Corporation, Redwood Shores, CA (US)

(72) Inventors: Vamsi Motukuru, Monmouth Junction, NJ (US); Vikas Pooven Chathoth, Bangalore (IN); Vipin Anaparakkal Koottayi, Trikarpur (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/491,076

(22) Filed: Sep. 19, 2014

(65) Prior Publication Data

US 2015/0088978 A1 Mar. 26, 2015

Related U.S. Application Data

(60) Provisional application No. 61/880,598, filed on Sep. 20, 2013.

(51) Int. Cl.
| | | |
|---|---|---|
| *G06F 15/16* | (2006.01) | |
| *G06F 7/04* | (2006.01) | |
| *H04L 29/06* | (2006.01) | |
| *H04L 29/08* | (2006.01) | |

(52) U.S. Cl.
CPC ............ *H04L 67/148* (2013.01); *H04L 67/02* (2013.01); *H04L 63/08* (2013.01); *H04L 63/0815* (2013.01); *H04L 63/0838* (2013.01); *H04L 67/14* (2013.01); *H04L 67/141* (2013.01); *H04L 67/146* (2013.01)

(58) Field of Classification Search
CPC ....... H04L 67/148; H04L 67/02; H04L 67/14; H04L 67/146; H04L 63/08; H04L 63/0815; H04L 67/141; H04L 63/0838; H04L 67/142

USPC .......................... 709/203, 217, 227; 726/3, 4
See application file for complete search history.

(56) References Cited

U.S. PATENT DOCUMENTS

| | | | |
|---|---|---|---|
| 6,041,357 A | 3/2000 | Kunzelman et al. | |
| 6,055,637 A | 4/2000 | Hudson et al. | |
| 6,076,108 A | 6/2000 | Courts et al. | |
| 6,178,511 B1 | 1/2001 | Cohen et al. | |

(Continued)

FOREIGN PATENT DOCUMENTS

| | | |
|---|---|---|
| EP | 1864240 A | 12/2007 |
| WO | 2013/049461 A2 | 4/2013 |

(Continued)

OTHER PUBLICATIONS

Murdoch, S.J., Apr. 2008. Hardened stateless session cookies. In International Workshop on Security Protocols (pp. 93-101). Springer Berlin Heidelberg.*

(Continued)

*Primary Examiner* — Taylor Elfervig
(74) *Attorney, Agent, or Firm* — Kilpatrick Townsend & Stockton LLP

(57) ABSTRACT

An enterprise software system access manager saves cookies for users' sessions on client devices but creates server-side sessions on the fly when needed for the users to access certain features, when there is a constraint on the client device, or due to application policies. The server-side session objects can have references to the client-side cookies and can have key-value pairs added to them instead of the associated cookie.

20 Claims, 7 Drawing Sheets

(56) References Cited

U.S. PATENT DOCUMENTS

| | | |
|---|---|---|
| 6,338,064 B1 | 1/2002 | Ault et al. |
| 6,385,724 B1 | 5/2002 | Beckman et al. |
| 6,811,873 B2 | 11/2004 | Nadkarni |
| 7,137,006 B1 | 11/2006 | Grandcolas et al. |
| 7,225,256 B2 | 5/2007 | Villavicencio |
| 7,296,290 B2 | 11/2007 | Barriga et al. |
| 7,426,642 B2 | 9/2008 | Aupperle et al. |
| 7,437,594 B1 | 10/2008 | Mount et al. |
| 7,496,953 B2 | 2/2009 | Andreev et al. |
| 7,747,746 B2 | 6/2010 | Thayer et al. |
| 7,761,911 B2 | 7/2010 | Song |
| 7,805,529 B2 | 9/2010 | Galluzzo et al. |
| 7,818,582 B2 | 10/2010 | Marion et al. |
| 7,886,000 B1 | 2/2011 | Polis et al. |
| 7,908,380 B1 | 3/2011 | Chu et al. |
| 7,996,376 B2 | 8/2011 | Singh et al. |
| 8,001,232 B1 | 8/2011 | Saulpaugh et al. |
| 8,073,954 B1 | 12/2011 | Tu et al. |
| 8,117,649 B2 | 2/2012 | Hardt |
| 8,244,907 B2 | 8/2012 | Hinton et al. |
| 8,365,266 B2 | 1/2013 | Bogner |
| 8,438,635 B2 | 5/2013 | Das et al. |
| 8,442,943 B2 | 5/2013 | Multer et al. |
| 8,468,586 B2 | 6/2013 | Koottayi et al. |
| 8,495,195 B1 | 7/2013 | Abidogun et al. |
| 8,544,069 B1 | 9/2013 | Subbiah et al. |
| 8,627,435 B2 | 1/2014 | Sirota |
| 8,650,305 B2 | 2/2014 | Booth et al. |
| 8,756,704 B2 | 6/2014 | Castellucci et al. |
| 8,819,444 B2 | 8/2014 | Shahbazi et al. |
| 8,843,997 B1 | 9/2014 | Hare |
| 8,898,765 B2 | 11/2014 | Goyal et al. |
| 8,955,037 B2 | 2/2015 | Srinivasan et al. |
| 9,083,690 B2 | 7/2015 | Subramanya et al. |
| 9,104,451 B2 | 8/2015 | Subramanya et al. |
| 9,247,006 B2 | 1/2016 | Mathew et al. |
| 9,544,293 B2 | 1/2017 | Mathew et al. |
| 9,769,147 B2 | 9/2017 | Mathew et al. |
| 2002/0029269 A1 | 3/2002 | McCarty et al. |
| 2002/0078365 A1 | 6/2002 | Burnett et al. |
| 2004/0003259 A1 | 1/2004 | Chang |
| 2005/0091655 A1 | 4/2005 | Probert et al. |
| 2005/0108570 A1* | 5/2005 | Gopalraj ............... H04L 67/143 726/4 |
| 2005/0120091 A1* | 6/2005 | Casais ................. H04L 29/06 709/217 |
| 2005/0144482 A1 | 6/2005 | Anuszewski |
| 2006/0059546 A1 | 3/2006 | Nester et al. |
| 2006/0218630 A1 | 9/2006 | Pearson et al. |
| 2006/0236382 A1 | 10/2006 | Hinton et al. |
| 2006/0277596 A1* | 12/2006 | Calvert ............... H04L 63/0218 726/3 |
| 2007/0147247 A1 | 6/2007 | Kalonji et al. |
| 2007/0192326 A1 | 8/2007 | Angal et al. |
| 2008/0294781 A1 | 11/2008 | Hinton et al. |
| 2009/0037763 A1 | 2/2009 | Adhya et al. |
| 2010/0131755 A1 | 5/2010 | Zhu et al. |
| 2010/0146611 A1 | 6/2010 | Kuzin et al. |
| 2012/0078708 A1 | 3/2012 | Taylor et al. |
| 2012/0191842 A1 | 7/2012 | Hu et al. |
| 2012/0254949 A1 | 10/2012 | Mikkonen et al. |
| 2012/0254957 A1 | 10/2012 | Fork et al. |
| 2012/0266229 A1* | 10/2012 | Simone .................... G06F 21/41 726/9 |
| 2012/0291090 A1 | 11/2012 | Srinivasan et al. |
| 2013/0036454 A1 | 2/2013 | Purvis et al. |
| 2013/0073670 A1 | 3/2013 | Das et al. |
| 2013/0198818 A1* | 8/2013 | Hitchcock ............... H04L 63/08 726/5 |
| 2014/0344326 A1 | 11/2014 | Kamath et al. |
| 2015/0082029 A1* | 3/2015 | Volchok ............... H04L 9/0819 713/164 |
| 2015/0088978 A1 | 3/2015 | Motukuru et al. |
| 2015/0089569 A1 | 3/2015 | Sondhi et al. |
| 2015/0089570 A1 | 3/2015 | Sondhi et al. |
| 2015/0089571 A1 | 3/2015 | Srinivasan et al. |
| 2015/0089579 A1 | 3/2015 | Manza et al. |
| 2015/0089580 A1 | 3/2015 | Manza et al. |
| 2015/0089596 A1 | 3/2015 | Sondhi et al. |
| 2015/0089597 A1 | 3/2015 | Srinivasan et al. |
| 2015/0089604 A1 | 3/2015 | Mathew et al. |
| 2015/0089614 A1 | 3/2015 | Mathew et al. |
| 2015/0089617 A1 | 3/2015 | Sondhi et al. |
| 2015/0089619 A1 | 3/2015 | Manza et al. |
| 2015/0089620 A1 | 3/2015 | Manza et al. |
| 2015/0089622 A1 | 3/2015 | Sondhi et al. |
| 2015/0089623 A1 | 3/2015 | Sondhi et al. |
| 2016/0219040 A1 | 7/2016 | Mathew et al. |
| 2016/0248758 A1 | 8/2016 | Mathew et al. |
| 2016/0381000 A1 | 12/2016 | Mathew et al. |
| 2017/0034152 A1 | 2/2017 | Subramanya et al. |
| 2017/0085556 A1 | 3/2017 | Mathew et al. |
| 2017/0118218 A1 | 4/2017 | Koottayi et al. |
| 2017/0118222 A1 | 4/2017 | Subramanya et al. |

FOREIGN PATENT DOCUMENTS

| | | |
|---|---|---|
| WO | 2015/042546 A1 | 3/2015 |
| WO | 2015/042547 A1 | 3/2015 |

OTHER PUBLICATIONS

V. Samar, "Single sign-on using cookies for Web applications," Enabling Technologies: Infrastructure for Collaborative Enterprises, 1999. (WET ICE '99) Proceedings. IEEE 8th International Workshops on, Stanford, CA, 1999, pp. 158-163.*

G. Pujolle, A. Serhrouchni and I. Ayadi, "Secure session management with cookies," 2009 7th International Conference on Information, Communications and Signal Processing (ICICS), Macau, 2009, pp. 1-6.*

Italo Dacosta, Saurabh Chakradeo, Mustaque Ahamad, and Patrick Traynor. 2012. One-time cookies: Preventing session hijacking attacks with stateless authentication tokens. ACM Trans. Internet Technol. 12, 1, Article 1 (Jul. 2012), 24 pages.*

BIG-IP Access Policy Manager, http://www.f5.com/pdf/products/big-ip-access-policy-manager-ds.pdf, 13 pages.

Ferguson, A. and Hockings, C. Session management server: Session transitions and state. ibm.com/developerworks/ [online]. Jun. 25, 2007, IBM [retrieved May 18, 2015]. Retrieved from the Internet: <URL: http://www.ibm.com/developerworks/tivoli/library/t-sms-states/>, 7 pages.

Gaur, N. IBM Extreme Transaction Processing (XTP) Patterns: Scalable and robust HTTP session management with WebSphere eXtreme Scale. ibm.com/developerworks/ [online]. May 27, 2009, IBM [retrieved Jan. 6, 2015]. Retrieved from the Internet: <URL: http://www.ibm.com/developerworks/websphere/library/techarticles/0905_gaur/0905_gaur.html>, 8 pages.

IBM Security Access Manager for Enterprise Single Sign-On. Data Sheet [online]. Copyright 2013 IBM Corporation [retrieved on Feb. 12, 2015]. Retrieved from the Internet: <URL: http://onwireco.com/wp-content/uploads/2013/12/IBM_Security_Access_Manager_For_Enterprise_Single_Sign-On.pdf>, 8 pages.

Impersonate another user: Dynamics CRM 2015. Copyright 2015 Microsoft [retrieved Jun. 25, 2015]. Retrieved from the Internet: <URL: https://msdn.microsoft.com/en-us/library/gg334744.aspx>, 1 page.

Implementing Single Sign-On Across Multiple Organizations. Developer.force.com, http:/ /wiki.developerforce.com/page/Implementing_Single_Sign-On_Across_Multiple_Organizations, Dec. 19, 2013, 8 pages.

Installing vCenter Single Sign-On in a multisite deployment (2034074). kb.vmware.com [online]. Copyright 2014 VMware, Inc. [retrieved Jan. 7, 2015]. Retrieved from the Internet: <URL: http://kb.vmware.com/selfservice/microsites/search.do?language=en_US&cmd=displayKC&externalId=2034074>, 2 pages.

Mortimore, C. and Yewell, E. Implementing Single Sign-On Across Multiple Organizations. developer.salesforce.com [online]. Copyright 2000-2014 salesforce.com, Inc. [retrieved Jan. 7, 2015].

(56) References Cited

OTHER PUBLICATIONS

Retrieved from the Internet: <URL: https://developer.salesforce.com/page/Implementing_Single_Sign-On_Across_Multiple_Organizations>, 15 pages.

Multiple Data Centers. support.ca.com [online]. Copyright 2014 CA [retrieved Jan. 7, 2015]. Retrieved from the Internet: <URL: https://support.ca.com/cadocs/0/CA%20SiteMinder%2012%2052%20SP1-ENU/Bookshelf_Files/HTML/idocs/index.htm?toc.htm?706393.html?intcmp=searchresultclick&resultnum=452>, 8 pages.

Oracle Enterprise Single Sign-On Suite Plus 11gR2 PS2. White Paper [online]. Jan. 2014, Oracle Corporation [retrieved on Jul. 30, 2015]. Retrieved from the Internet: <URL: http://www.oracle.com/technetwork/middleware/id-mgmt/esso-suite-technical-whitepaper-1519077.pdf>, 25 pages.

Oracle Fusion Middleware Developer's Guide for Oracle Access Management: Developing an Application to Manage Impersonation. Copyright 2015 Oracle [retrieved on Jun. 26, 2015]. Retrieved from the Internet: <URL: https://docs.oracle.com/cd/E52734_01/oam/AIDEV/impersonation.htm#AIDEV422>, 11 pages.

Oracle Fusion Middleware Developing Web Applications, Servlets, and JSPs for Oracle WebLogic Server: Using Sessions and Session Persistence. Copyright 2015 Oracle [retrieved May 18, 2015]. Retrieved from the Internet: <URL: http://docs.oracle.com/cd/E12839_01/web.1111/e13712/sessions.htm#WBAPP301>, 6 pages.

Oracle Fusion Middleware Performance and Tuning for Oracle WebLogic Server: Tuning Web Applications. Copyright 2015 Oracle [retrieved May 18, 2015]. Retrieved from the Internet: <URL: http://docs.oracle.com/cd/E12839_01/web.1111/e13814/webapptune.htm#PERFM368>, 3 pages.

Rivard, J. Clearing Novell Access Manager Application Sessions. Jan. 26, 2009, NetIQ [retrieved May 19, 2015]. Retrieved from the Internet: <URL: https://www.netiq.com/communities/cool-solutions/clearing-novell-access-manager-application-sessions/>, 4 pages.

Stirpe, P. and Shah, A. Time-out Management in Multi-domain Single Sign-On. Strattagroup.com [online]. Copyright 2005 The Stratta Group [retrieved Jan. 6, 2015]. Retrieved from the Internet: <URL: http://www.strattagroup.com/tsg/pubs/ssotime-out.pdf>, 13 pages.

Symantec Identity: Access Manager. Data Sheet [online]. Copyright 2014 Symantec Corporation [retrieved on Feb. 12, 2015]. Retrieved from the Internet: <URL: http://www.symantec.com/content/en/us/enterprise/fact_sheets/b-symantec_identity_access_manager_DS_21227840>, 2 pages.

Volodarsky, M. asp.net: Fast, Scalable, and Secure Session State Management for Your Web Applications. Copyright 2015 Microsoft [retrieved May 18, 2015]. Retrieved from the Internet: <URL: https://msdn.microsoft.com/en-us/magazine/cc163730.aspx>, 9 pages.

Ye, W. A complete Impersonation Demo in C#.net. Jun. 20, 2013, Code Project [retrieved on Jun. 25, 2015]. Retrieved from the Internet: <URL: http://www.codeproject.com/Articles/125810/A-complete-Impersonation-Demo-in-Csharp-NET>, 12 pages.

U.S. Appl. No. 61/880,335, filed Sep. 20, 2013.
U.S. Appl. No. 61/880,400, filed Sep. 20, 2013.
U.S. Appl. No. 61/880,569, filed Sep. 20, 2013.
U.S. Appl. No. 61/880,598, filed Sep. 20, 2013.
U.S. Appl. No. 14/754,222, filed Jun. 29, 2015.
U.S. Appl. No. 14/135,053, Non-Final Office Action dated Jan. 29, 2015, 16 pages.
U.S. Appl. No. 14/135,053, Final Office Action dated Jul. 6, 2015, 17 pages.
U.S. Appl. No. 14/135,053, Non-Final Office Action dated Nov. 25, 2015, 18 pages.
U.S. Appl. No. 14/135,053, Notice of Allowance dated May 20, 2016, 10 pages.
U.S. Appl. No. 14/137,775, Non-Final Office Action dated May 22, 2015, 10 pages.
U.S. Appl. No. 14/137,775, Notice of Allowance dated Sep. 16, 2015, 9 pages.
U.S. Appl. No. 15/005,365, Non-Final Office Action dated Aug. 24, 2016, 11 pages.

"Developing an Application to Manage Impersonation," *Oracle© Fusion Middleware Developer's Guide for Oracle Access Management* https://docs.oracle.com/cd/E52734_01/oam/AIDEV/impersonation.htm#AIDEV422 (Oct. 2016) 11 pages.

"Developing an Application to Manage Impersonation" *Fusion Middleware Developer's Guide for Oracle Access Management* (Nov. 2012) 10 pages.

"IBM Security Access Manager for Enterprise Single Sign-On" retrieved from the Internet Nov. 10, 2016: http://www-03.ibm.com/software/products/en/access-mgr-esso, 2 pages.

"Impersonate another user" Microsoft Dynamics CRM 2015 https://msdn.microsoft.com/en-us/library/gg334744.aspx (Jun. 2015) 1 page.

"Session management server: Session transitions and state," IBM, Inc. http://www.ibm.com/developerworks/tivoli/library/t-sms-states/ (Jun. 2007) 7 pages.

"The art of logging out," KTH Sweden, Apr. 26, 2013 https://www.kth.se/social/group/cas/page/the-art-of-logging-out/, 2 pages.

"Tuning Web Applications" *Oracle Fusion Middleware Performance and Tuning for Oracle WebLogic Server* http://docs.oracle.com/cd/E12839_01/web.1111/e13814/webapptune.htm#PERFM368 (Copyright 2015) 3 pages.

"Understanding Jive Mobile's SSO Compliance," Jive Software, Jun. 25, 2012 https://community.jivesoftware.com/docs/DOC-61829, 11 pages.

"User Session Monitoring for CA Single Sign-On," CA Technologies, Copyright 2015 http://www.ca.com/~/media/Files/AddOnServicesComponents/user-session-monitor-for-ca-single-sign-on.pdf, 1 page.

"Using Sessions and Session Persistence" *Oracle Fusion Middleware Developing Web Applications, Servlets, and JSPs for Oracle WebLogic Server* http://docs.oracle.com/cd/E12839_01/web.1111/e13712/sessions.htm#WBAPP301 (May 2009) 6 pages.

Rivard "Clearing Novell Access Manager Application Sessions," https://www.netiq.com/communities/cool-solutions/clearing-novell-access-manager-application-sessions/ (Jan. 2009) 4 pages.

Volodarsky "asp.net: Fast, Scalable, and Secure Session State Management," Microsoft MSDN Magazine https://msdn.microsoft.com/en-us/magazine/cc163730.aspx (Sep. 2005) 9 pages.

Ye "A complete Impersonation Demo" http://www.codeproject.com/Articles/125810/A-complete-Impersonation-Demo-in-Csharp-NET (Jun. 2013) 12 pages.

U.S. Appl. No. 14/754,222 Non-Final Office Action, dated Dec. 1, 2016, 10 pages.
U.S. Appl. No. 14/814,209 Non-Final Office Action, dated Jan. 11, 2017, 13 pages.
U.S. Appl. No. 14/135,053 Notice of Allowance, dated Aug. 31, 2016, 9 pages.

Haire, A Solution to SSO Authentication and Identity Management: Lessons Learned, Atlassian Blog, May 16, 2013, 5 pages.

U.S. Appl. No. 15/005,365, Final Office Action dated Mar. 10, 2017, 12 pages.
U.S. Appl. No. 14/754,222, Notice of Allowance dated May 17, 2017, 5 pages.
U.S. Appl. No. 14/814,209, Final Office Action dated Jul. 31, 2017, 19 pages.
U.S. Appl. No. 15/143,240, Non-Final Office Action dated Jun. 5, 2017, 11 pages.

* cited by examiner

COOKIE BASED SESSION MANAGEMENT

CROSS-REFERENCES TO RELATED APPLICATIONS

This application claims the benefit of and priority to U.S. Provisional Patent Application No. 61/880,598 filed Sep. 20, 2013 and entitled "Cookie Based Session Management," the entire disclosure of which is hereby incorporated by reference for all purposes.

BACKGROUND

1. Field of the Art

Generally, the present application relates to data processing. Specifically, the application is related to hybrid client-side/server-side session storage for tracking users on enterprise software networks in which a session can be transformed from a client-side, cookie based session into a server-side session object.

2. Discussion of the Related Art

Single Sign-On (SSO) user sessions maintained on a server side of an enterprise software system offer flexibility to support various integrations that require session validation at the server. A server-side session can be accessed from the server side, and session management operations like session sniping, limiting the number of session per users, and enumerating sessions created by a user can be performed using an access manager user interface (UI) behind the enterprise software system's firewall. One drawback of sessions maintained at the server side are the scalability issues in maintaining the whole set of concurrent sessions in server. That is, a large number of users become unwieldy for a server to manage.

The alternative, cookie-based sessions, can support more concurrent sessions because adding new sessions will not require server side resources. Any server in the cluster can accept and work with the cookie provided by the browser. But this approach has the disadvantage that server side session validations typically cannot be done without the presence of the cookie (or something akin to a cookie). Purely cookie-based solutions make the server stateless so that the server does not remember any particular user between requests to the web server. Furthermore, cookie size limitations on browsers and limitations on existing mobile agents may not be able to handle the extra data required for some enterprise network implementations.

There is a need in the art for more efficient user tracking in enterprise applications.

BRIEF SUMMARY

An enterprise software system access manager manages a cookie for a session on a user's client device until the user accesses a feature of an application that requires a server-side session object. A server-side session object is then instantiated with a reference to the client device cookie, and additional data is added to the server-side session object as required.

In some embodiments, data from the client device's cookie is copied or moved (i.e., copied from and deleted on the client device) to the server-side session object. The entire contents of the cookie can be copied/moved or only a portion. In other embodiments, the client device cookie is not altered, and new key-value pairs for session tracking are added to the server-side session object. The server-side session object maintains a pointer to the cookie on the user's client device.

At what point a client-side cookie is augmented with a server-side session object can be determined by a predetermined policy selected by an administrator of the enterprise network so that the determination is automatic. The transition can occur, for example, when a user accesses a particular feature of an application (or when first accessing the application) in the enterprise network. The feature can be accessed by a uniform resource locator (URL) either directly by the user or through a graphical element that calls the URL in the underlying code.

"Automatic" includes without contemporaneous, direct human intervention, or as otherwise known in the art Yet other embodiments relate to systems and machine-readable tangible storage media that employ or store instructions for the methods described above.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

DETAILED DESCRIPTION

Figure 1:
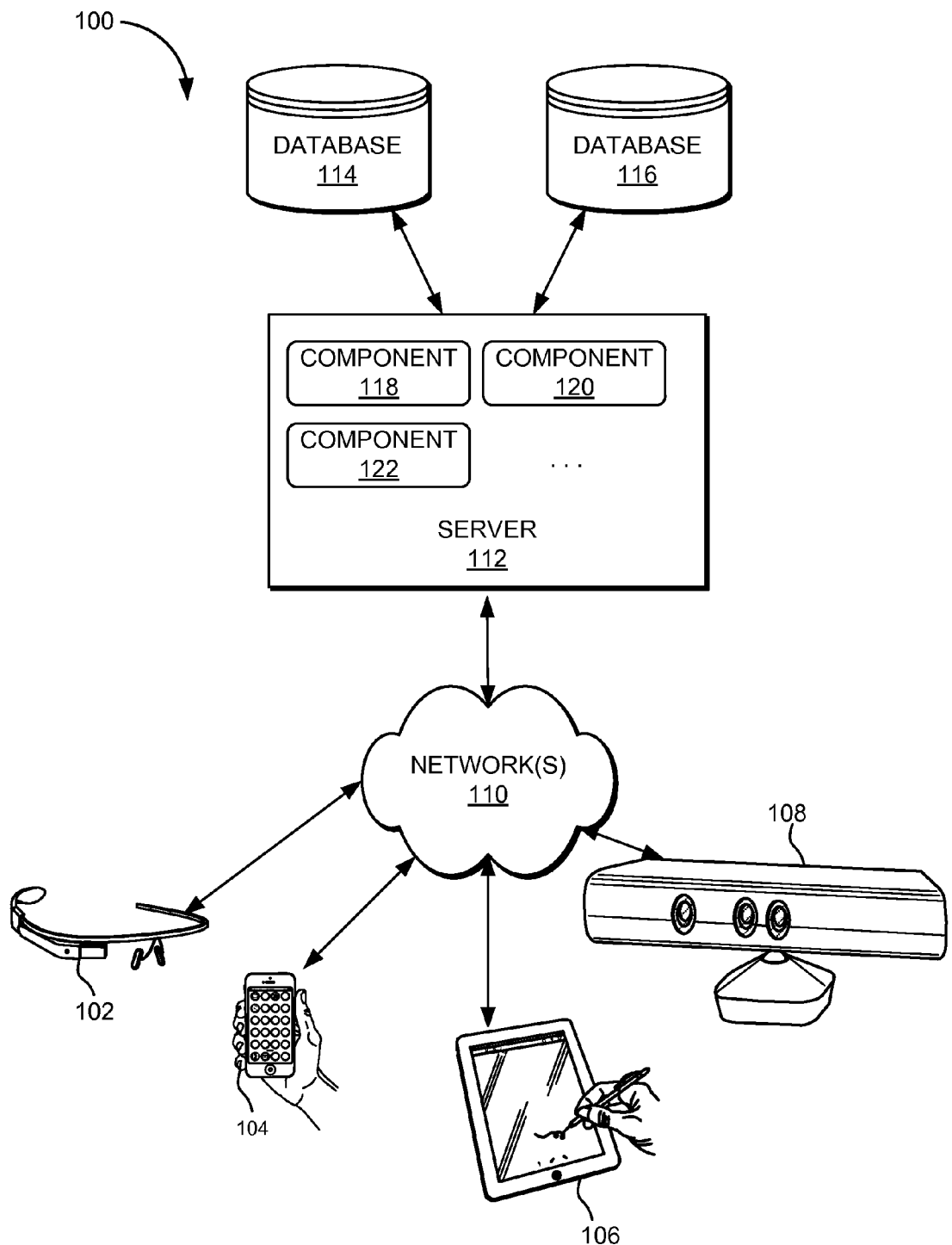
FIG. 1 depicts a simplified diagram of a distributed system for implementing one of the embodiments.

In the following description, for the purposes of explanation, specific details are set forth in order to provide a thorough understanding of embodiments of the invention. However, it will be apparent that various embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" or "computer-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable or computer-readable medium. One or more processors may perform the necessary tasks.

Systems depicted in some of the figures may be provided in various configurations. In some embodiments, the systems may be configured as a distributed system where one or more components of the system are distributed across one or more networks in a cloud computing system. In further embodiments, the systems may be configured as a single system where one or more components of the system incorporated into a single structure or package.

INTRODUCTION

FIG. 1 depicts a simplified diagram of distributed system 100 for implementing one of the embodiments. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model or a Platform as a Serves (PaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in FIG. 1, software components 118, 120, and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 102, 104, 106, and/or 108 can be general purpose personal computers including, by way of example, personal computers and/or laptop computers running various versions of Microsoft Windows®, Apple Macintosh®, and/or Linux operating systems. Client computing devices 102, 104, 106, and/or 108 can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Session Management

Enterprise computer networks may be used to meet the computing needs of one or more organizations, such as businesses, universities, government organizations, or the like. The enterprise computer network infrastructure may be spread over different data centers that may be dispersed over different geographic locations. Various resources included within an enterprise computer network may be managed and/or stored by the different data centers. For example, a first resource may be stored and managed by a first data center and a second resource may be stored and managed by a second data center. Resources may include any item managed and/or stored by the data centers and available for access by one or more users, such as an application, a document, a file, and/or the like. A user may have to be authenticated and authorized by the first data center in order to access the first resource and may have to be authenticated and authorized by the second data center in order to access the second resource. The enterprise computer network may offer a single sign-on (SSO) functionality that allows a user to log into one data center and then access other data centers using the same authentication session without re-logging in each time a different data center is accessed. For example, SSO allows a user to enter a username/password once in order to gain access to multiple resources located across different data centers.

A session is created for a user at each data center when the user is authenticated and/or authorized by each data center. The user's sessions are coordinated among the various data centers as the user accesses different resources dispersed among the data centers. A unique session identifier (ID) is created for each session for each user in each data center. For example, a user may have access to two different resources stored and/or managed in two different data centers. The separate session may be created for the user in each of the data centers, and each of the sessions will include a unique session ID (e.g., session ID 1 and session ID 2). A user request for one or more resources may hop across data centers within a single SSO session, requiring all the visited data centers to generate unique session identifiers for servicing the user request.

All sessions for the user should be synchronized so that all of the session information is consistent across the data centers. Further, when the user is logged out of a session at one data center and/or a session for the user at the data center is terminated, all other sessions should be terminated as well so that the user's sessions are logged out or terminated globally. However, using only unique session identifiers does not allow for these actions to be performed globally across all data centers within the enterprise network. This is due to the problem that a unique session identifier generated by one data center cannot be effectively reused at a second data center for various reasons.

As one example, the session IDs may be created using random number generators or some other form of unique number or name generation (e.g., built-in java virtual machine capability, a proprietary third-party service such as a database, or the like). An attempt to allow global session activity by forcing a second data center to use the unique identifier generated by a first data center poses the risk that the identifier from the first data center will collide with another user's unique identifier generated by the random number generator in the second data center. For example, a scenario may arise where a first user is given session ID 1 at the first data center and that session ID 1 is forced on the second data center as the user's session ID in the second data center. A second user may then be randomly given the same session ID 1 at the second data center. In this scenario, the first user and the second user will have the same session ID within the second data center. As a result, the uniqueness of the session IDs will be eliminated and the two users will not be distinguishable within the second data center. A second scenario may include forcing the session ID 1 on the second data center as the user's session ID in the second data center and then modifying the session ID 1 in order to distinguish the first user from the second user (e.g., by appending with a prefix or a suffix). However, adding a pre-defined value as a modifier to the session IDs may create a pattern, which eliminates the desired randomness of the session IDs and weakens the strength of the identifier in the security domain of the enterprise network.

As another example, the access manager may rely on a third-party proprietary service (e.g., a database) to randomly generate the unique identifiers. However, because a third-party component is used to generate the random number, the consumer component does not have the technical provision to supply the unique identifier to another data center.

Accordingly, because the unique session identifiers cannot be effectively reused across data centers, there is no way to simply and reliably perform user session actions globally across data centers using the identifiers. Accordingly, various systems and techniques are needed to enables various user session actions to be performed globally across the data centers, including global logout, global session termination, global session updates, and/or the like.

In general, a user operating a client device (e.g., client computing devices 102, 104, 106, or 108) may access server 112 of distributed system 100. An access gate may provide access control and may operate to protect components and any resources within server 112 against external and internal threats. For example, the access gate may include an agent component and a server side component. Each resource can be protected through an agent of the access gate. Each agent may be associated with a particular component and/or resource with which the resource is stored and/or managed. The associated component or resource of an agent may be referred to as the access gate agent's end point. The access gate agent may intercept user requests for one or more resources protected by it and check for user credentials in order to authenticate the user. The agent may then contact an access manager server to verify whether the resource is a protected resource that requires credentials for access. If the access manager indicates that the resource is not protected, the agent will grant access to the user. If the resource is protected, the agent will challenge the user for credentials.

An access manager server enables SSO functionality within distributed system 100 and may perform various session related functions for managing access to corresponding components and/or resources. For example, the access manager server may perform authentication and/or authorization of the client device when a user attempts to access one or more resources. Authentication is the process of proving that a user is who the user claims to be. To authenticate a user, the access manager server (e.g., using an access gate) may present a user with a request for authentication credentials in the form of a challenge (e.g., via the user's web browser). Authentication policies may specify the authentication methodology to be used for authenticating the user for whom the access must be provided on a given resource. The policies define the way in which the resource access is to be protected (e.g., type of encryption, or the like). Authorization is the process of determining if a user has a right to access a requested resource. Authorization policies may be defined that specify the conditions under which a user or group of users has access to a resource. For example, an administrator may only authorize certain users within a group to access particular resources.

An access manager server may receive and analyze cookies from client devices and/or session information from one or more data centers. An access manager may also manage session policies, which may include policies relating to re-authentication, session invalidation, and/or session retrievals. As used herein, "re-authentication" refers to a situation in which a user must re-enter credentials in order to be authenticated anew. "Session invalidation" may refer to the invalidation of sessions that may exist for a user in data centers other than the data center with which the user is currently interacting. In some embodiments, invalidation of a user session may include terminating the remote user session through a front-channel or back-channel operation. For example, front-channel communications may use a hypertext transfer protocol secure (HTTPS) protocol while a back-channel operation communication may use an open access protocol (OAP), or vice versa. In some embodiments, only back-channel invalidation of a user session are supported. As used herein, "session retrieval" or "on-demand session retrieval" may refer to the retrieval of session information from a remote data center before the creation of a local user session in a servicing data center. Session retrieval may be needed to ensure that dynamic session information is not lost when a user moves across data centers. Session retrieval may also ensure timeout information is tracked consistently across data centers so that a user is properly timed-out of a session when appropriate. Retrieval of session information may be done using a front-channel or back-channel operation.

In some embodiments, multiple access manager servers can be deployed as an access manager cluster in a data center, which allows for scalability and high availability. Multiple such geographically dispersed data centers with access manager clusters can be connected (wired or wirelessly) to constitute an access manager Multi Data Center (MDC). An access manager MDC satisfies high availability, load distribution, and disaster recovery requirements of access servers within an enterprise computer network. The MDC may act as a single logical access server and provides single sign on functionality for all of the resources registered in the MDC. To achieve SSO across the data centers, back end user sessions need to be migrated from the originating data center to the data center that is servicing the user. Synchronization of the databases among the data centers may not be practical due to latencies involved in transmitting data between the geographically dispersed databases. Accordingly, migration of user sessions may be accomplished using on demand session migration or session retrieval from each data center.

Figure 2:
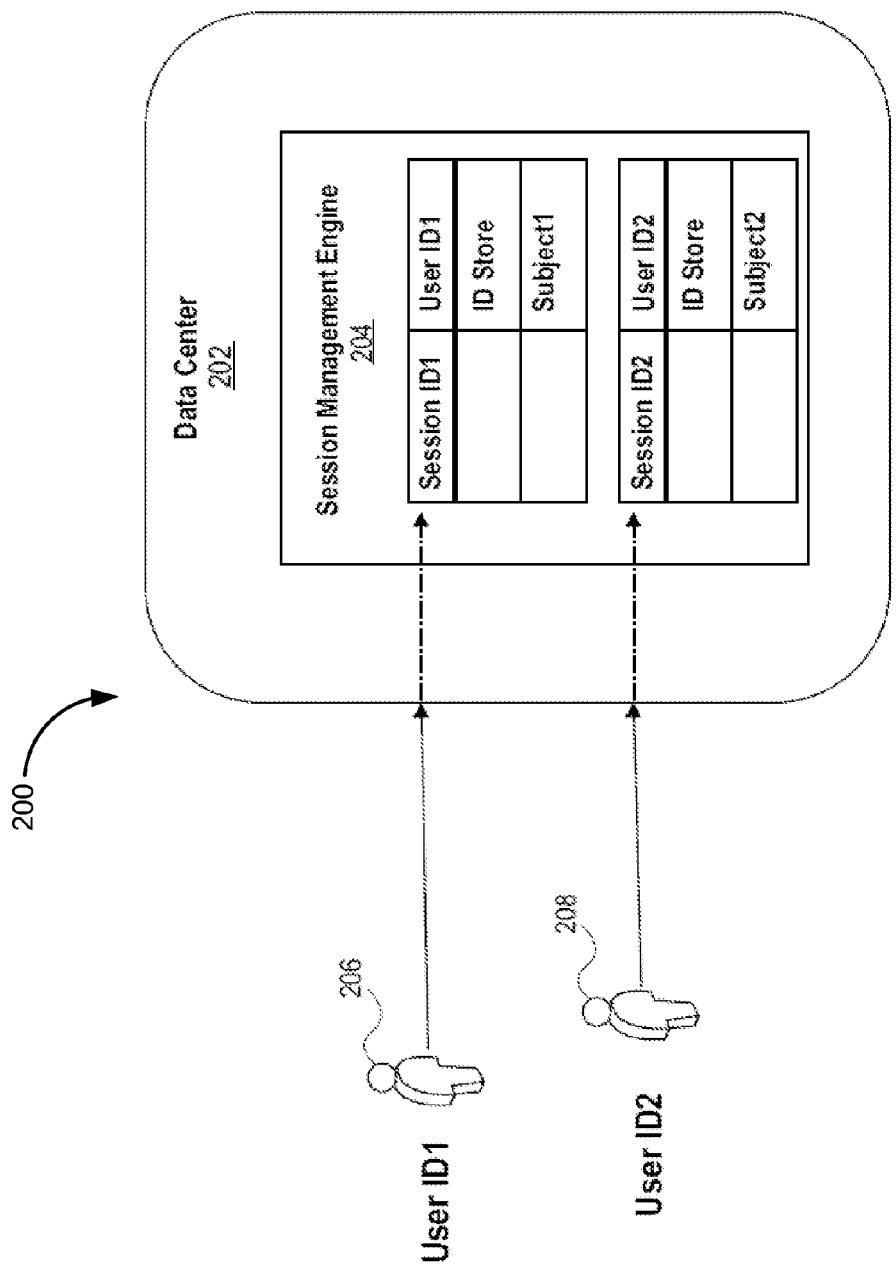
FIG. 2 illustrates a system for assigning session identifiers for user sessions in accordance with an embodiment.

A data center may identify each user session uniquely by generating a session identifier (ID). FIG. 2 illustrates a system 200 for assigning session IDs for user sessions within a data center 202. The data center 202 can provide users 206 and 208 access to various resources stored and/or managed by the data center cluster 202. Each of the users 206 and 208 is associated with a user ID that is stored in a specific location called an ID store. For example, user 206 is identified by user ID1 and user 208 is identified by user ID2. The data center 202 creates a session for each user and generates a unique session ID for each session. For example, session ID1 is generated for user 206 session ID2 is generated for user 208. The session IDs may be randomly generated using, for example, a random number generator.

When an enterprise network system is operated as a MDC, a user request for one or more resources can hop across data centers within a single SSO session, requiring all the visited data centers to generate unique session IDs for servicing the user request. In some embodiments, the access manager server may use a session management engine to generate this unique session identifier per user per data center.

Cookie Based Session Management

"Cookie based session management" (CBSME) by an enterprise network software environment (e.g., distributed system 100) can be a light weight session management solution that reduces server side overhead and can provide better scalability than purely server-side session management. CBSME may co-exist with the server side providing coherence-based session-based management. Cookie based session management can be a light weight solution that does not have the overhead of the server side distributed cache or database persistence of session data. This can be an optimum solution for applications like middleware applications, where an access manager works as a perimeter authenticator.

Linear scalability in throughput, and constant response time that is not dependent on the load, are some of the advantages of embodiments over coherence-based server side session management in the prior art.

In general, an access manager server can support a hybrid session that starts with a cookie and gets migrated to a server side session based on usage.

If the session does not use features that require the presence of a server side session, then all the session information can be kept in the cookie. For example, if a user is simply downloading patches, then no a server side session is unneeded. If a user session uses any of the features that require server side session, then a server side session will be created for that user session on his or her device, and required information will be added to the session. The server side session data can vary, for example from simple timeout information to handle inactivity, to all of the session data being stored on the server side to support session context assertion to third parties, which can be validated off line without user involvement.

In some embodiments, all of the sessions created will not have a server side presence; only user sessions that access advanced features that require server side session data will require or otherwise demand whole session data in server. This will allow an SSO server to scale better than the server side session-only implementation and support all the features supported by server side sessions.

Some features of embodiments are:
1. A session management engine that creates and validates a session based on a cookie or a session reference or both; and
2. Applications that are protected by the SSO server need not be aware of the type of the session used.

Some use cases addressed are:
1. Session attribute assertions and session presence assertion to third party applications that can access data from a resource only if the user session is active;
2. Cookie based sessions allows light weight server side sessions that can be replicated easily across a cluster; and
3. Cookie size configurations are supported based on client device limitations. For example, a mobile device that has limitations on supporting large cookies can be supported by moving the data to server side sessions transparently.

Figure 3:
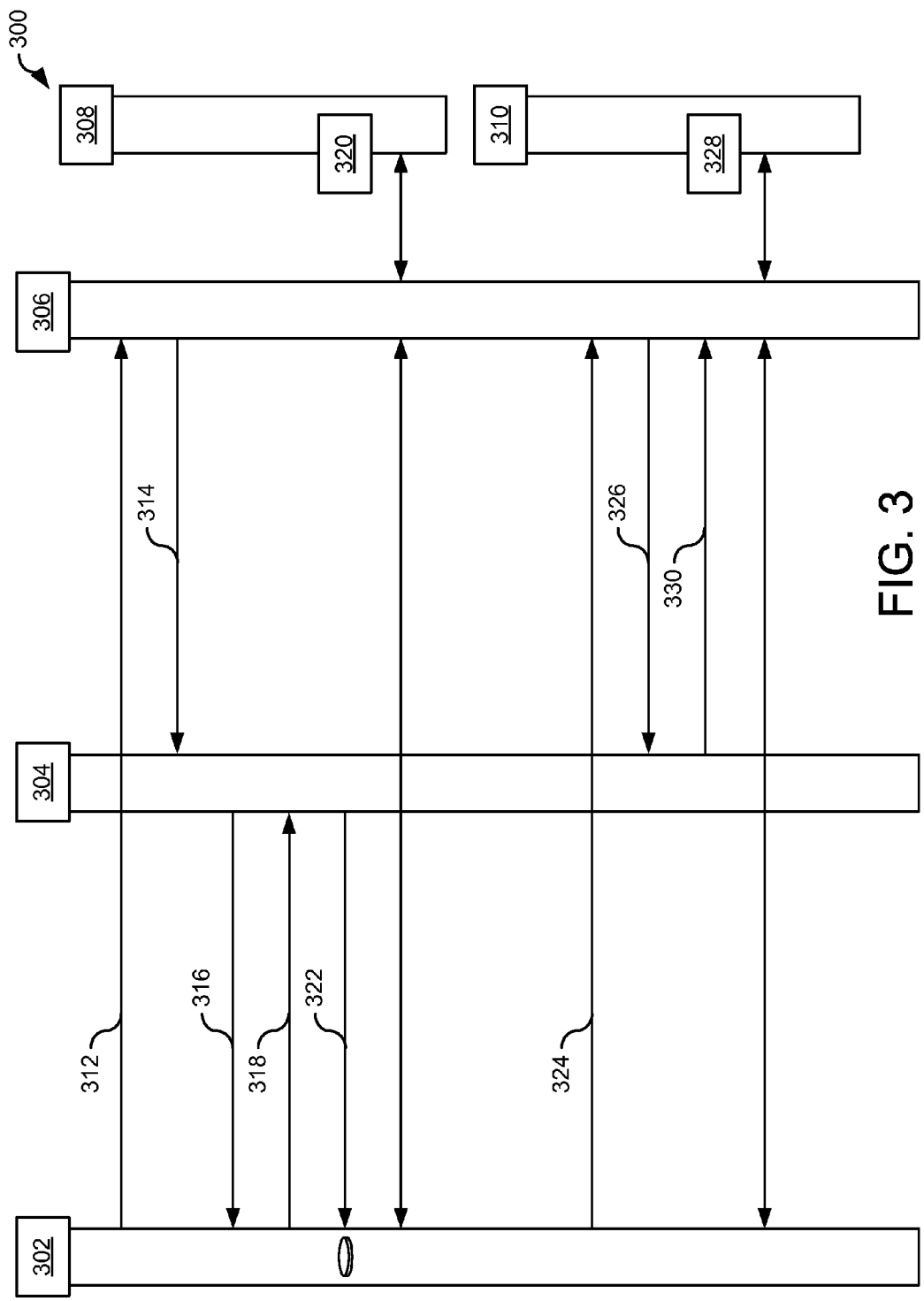
FIG. 3 illustrates system 300 for providing single sign-on access among a group of data centers within an enterprise computer network.

FIG. 3 illustrates system 300 for providing single sign-on access among a group of data centers within an enterprise computer network. In this example, system 300 includes client device 302, access manager 304, server 306 hosting one or more applications, data center 308, and data center 310. A user operating client device 302 may access an enterprise computer network with infrastructure distributed across various geographically dispersed data centers, such as data centers 308 and 310. Client device 302, access manager 304, server 306, data center 308, and data center 310 may be embodied as one or more computer systems or electronic devices. For example, claim device 302 may be a workstation, personal computer (PC), laptop computer, smart phone, wearable computer, or other networked electronic device.

Client device 302 may request access to one or more resources while using one or more applications hosted by server 306. Client device 302 can communicate with server 306 and/or data centers 308 and 310 using a particular protocol (e.g., hypertext transfer protocol (HTTP) or hypertext transfer protocol secure (HTTPS)). The protocol may be determined based on the type of resource. For example, an HTTPS request may be required to request sensitive or confidential resources.

The one or more resources may be stored and/or managed by data centers 308 and 310. Data centers 304 and/or 306 may include applications, web gates, and one or more access manager servers, along with other infrastructure, such as identity stores, databases, or the like. The applications may include the software needed to operate the enterprise computer network according to the organizational customer.

In response to access request 312 sent to server 306 to access one or more resources provided by data center 308, server 306 sends request 314 to access manager 304 to determine whether the user is authorized to access the one or more resources. Access manager 304 may send request 316 presenting the user with a request for authentication credentials (e.g., user name/password, or the like). In some embodiments, some resources within data center 308 or data center 310 may not protected, in which case access manager 304 may first query the corresponding data center determine if the requested resource is protected.

Client device 302 sends response 318 to the request for authentication credentials. Access manager 304 authenticates the user (and/or client device 302) upon receiving the proper credentials, for example, by validating the credentials against those stored in a directory. As a result of a valid authentication and/or authorization by access manager 304, a session is created for the user in data center 308 with a session identifier (ID) S1.

In this example, once the user is logged into data center 308, access manager server 304 creates session object 320 representing the session and sends cookie 322 to client device 302. Session object 320 is stored in data center 308 and cookie 322 is stored on client device 302. The user's session may be tracked by data center 308 using session object 320 in data center 308 and cookie 322 in client device 302. Session object 320 may include, for example, user name, user ID, one or more user preferences, or the like. In some embodiments, session object 320 may also include an IP address, an estimated geographic location of the user, preferred language, preferred locale, type of client device 302, version of an operating system on the client device 302, other information about the client device 302, or the like. In some embodiments, the session object may also include a length of time that the user has been on a particular web site and the number of times that the user may have previously accessed a particular web site.

Once logged in, client device 302 may access resources for which the user is authorized to access at data center 308, such as running different applications, accessing cloud storage, or the like. In this example, server 306 (or one or more applications thereon) moderates access to data center 308.

In certain embodiments, client device 302 requests access to server 306. Server 306 requests access manager 304 to authenticate client device 302 for one or more applications. Access manager 304 sends a prompt for a username and password to client device 302. A user then types in his or her username or password as credentials. Client device 302 sends the entered username and password to access manager 304. Access manager 304 may access a secure database to determine whether the username and password combination are valid. If so, access manager 304 sends for saving cookie 322 to client device 302. The user, who is now authenticated using credentials, can access the requested application of server 306.

The user may interact with the request application of server 306 or other applications in the enterprise network (i.e., everything to the right of and including access manager 304 in FIG. 3). This can be referred to as a single sign-on solution. The user accesses features that are supported by data center 308. If a feature does not require server side session management; a client-side cookie will suffice.

In various embodiments, client device 302 attempts to access a feature in the requested application of server 306 that has a limit on the number of concurrent users that can use it at the same time. Based on this determination, the application of server 306 requests a server side session from access manager 304 so that the number of concurrent users can be tracked. Access manager 304 instantiates server-side session object 320 with a reference to cookie 322. Thus, the session is tracked both in client-side cookie 322 and in server-side session object 320. Server side information can be sent to the application, indicating that server-side session object 320 is initialized and ready for tracking the user.

Limiting the number of users of a feature can be useful for security reasons or for monetizing third-party features. For example, a human resources (HR) application may have a module that includes sensitive payroll information. There might be limited access to this payroll information, and limiting the number of users that can access it at one time may contribute to limiting access to those with a need to know. As another example, a third-party resource may limit access to its subscription database (e.g., Dun & Bradstreet® reports) to a number of 'seats' that have been purchased by a company that uses the enterprise network. There may be unlimited numbers of users using other parts of a business analysis report generator application, but accessing the subscription database for a particular part of the report generator triggers a user's cookie to be turned into a server-side session object for limiting the number of users.

Determining whether a feature demands a server-side session may include checking an administrator-configurable policy. The policy may be configured by listboxes, radio buttons, or other graphical user interface (GUI) elements. It can also be configured by script language, such as through Groovy script. The policy may dictate that a particular feature requires the number of concurrent users to be limited, a time limit for sessions be enforced, or for security purposes. That a number of concurrent users is limited dictates that a server-side session be initiated.

Determining whether a feature of an application demands a server-side session may include checking to see what device a user is currently using. If the device is a small, memory limited mobile device, and the feature is bound to save a large amount of session data, then it would be prudent for the enterprise network to shift the client-side cookie to the server so that the feature is unhampered by storage concerns.

Although a server-side session object may be initialized and end up as the primary tracker of the user's session, in some embodiments data can still be saved to the client-side cookie. However, it is more likely that new data (e.g., key/value pairs) are saved to the session object on the server.

In certain embodiments, the user of client device 302 may request access to one or more resources provided by data center 310. For example, client device 302 may send request 324 to server 306 in order to access data center 310. Alternatively, for various reasons, the user's request for a resource may be directed to data center 310 instead of data center 308 in which the user was originally authenticated. For example, the resource requested by the user may be stored and/or managed by data center 310 and not by data center 308. As another example, the user request may be directed to data center 310 in the event a load spike occurs and data center 308 cannot handle the request. Data center 310, in this example, is in a different geographic part of the world than data center 308, in which the user of client device 302 currently has a session.

Upon attempting to access the resource, server 306 sends request 326 to access manager 304 to determine whether the user is authorized to access the one or more resources. Access manager 304 first determines that the user does not yet have a session on data center 310. In some embodiments, when a request reaches access manager 304, MDC policies of the MDC (explained further below) may identify that a multi data center scenario exists and that a valid session is not present in the data center 310. In some embodiments, cookie 322 may include a reference to one or more previously visited data centers, such as data center 308. Access manager 304 may read cookie 322 and may determine, based on the reference, that a session was previously created for the user in data center 308. Access manager 304 may then contact data center 308 in order to verify that a valid session exists on data center 308.

Once it is verified that a valid session exists in data center 308, access manager 304 may create a session for the user in data center 310 with a session identifier (ID) S2. In this example, once the user is logged into data center 310, access manager server 304 creates session object 328 representing the session. Session object 328 is stored in data center 310. The user's session may be tracked by data center 310 using session object 328 in data center 310 (as well as in cookie 322 in client device 302). Session object 328 may include, for example, user name, user ID, one or more user preferences, or the like. In some embodiments, session object 328 may also include an IP address, an estimated geographic location of the user, preferred language, preferred locale, type of client device 302, version of an operating system on the client device 302, other information about the client device 302, or the like. In some embodiments, the session object may also include a length of time that the user has been on a particular web site and the number of times that the user may have previously accessed a particular web site.

Access manager 304 may send server-side session information 330 for the user to server 306. Once the user us authenticated to data center 310, the user may access resources stored and/or managed by data center 310 for which the user is authorized to access. Upon creating a new session, access manager may update cookie 322 or generate a new cookie.

In some embodiments, one or more MDC policies may be used to create the session at data center 310. The MDC policies may be set up by an administrator of the enterprise computer network. For example, an MDC may have a set of policies that apply to all data centers within the MDC. A new session may then be created according to the one or more applicable MDC policies. The policies may be stored in a data center configuration file with configuration values indicating whether one or more available policy options are applicable to the MDC.

One example policy may include an on-demand session retrieval policy. If an on-demand session retrieval policy is selected to apply to the MDC, data center 310 may be required to verify that a session is valid in data center 308 (session with session ID S1). Once session S1 is verified, data center 310 fetches corresponding session information from data center 308 and assigns the session information to the new session S2 that will be created in data center 310. Assigning the session information to the new session ensures that both of the sessions S1 and S2 are in synchronization with one another.

Another example policy may include whether a session must be anchored to the data center servicing the user. This type of policy requires that only one active session is allowed for a particular user across the data centers within the MDC. If this policy is selected to apply to the MDC, then after data center 310 performs session retrieval (validating session S1 and fetching the session information for use in creating session S2 in data center 310) and creates session S2, the session S1 in data center 310 can be terminated so that only session S2 is active for the user.

A third example policy may include a reauthenticate policy. A reauthenticate policy indicates that whenever a user is directed to a data center for the first time, that user is required to enter credentials for authentication, regardless of a valid session existing in another data center. For example, even though the user of client device 302 has valid session S1 in data center 308, the user will be required to reauthenticate in order to access resources stored and/or managed by data center 310. A reauthentication policy can be set to apply to particular data centers and/or particular resources. For example, the policy for certain sensitive documents stored and/or managed by a data center may require that a user reauthenticates to the data center each time the document is accessed.

A fourth example policy may include a session continuation on sync failure policy. This policy may direct a data center to proceed to authenticate the user even if session information cannot be fetched from a remote data center. For example, when the user is directed to data center 310 for a second resource, data center 310 will attempt to fetch session information from data center 308 based on cookie 322. However, for some reason, data center 310 may not be able to communicate with data center 308 (e.g., due to a high load at data center 308, network delay, or the like) and thus will not be able to fetch or synchronize its session information with that from data center 308. In these cases, if the session continuation on sync failure policy flag is set to apply to the MDC, data center 310 may proceed to create a session for the user without synchronizing with data center 308.

Once a session is created for a user using one or more MDC policies, a global unified session identifier can be used in conjunction with the session IDs to allow for performance of session actions on a global basis across all data centers within the MDC network. Session actions may include global logout, global session termination, global session updates, and/or any other activity that relates to a user's sessions across the data centers. A global unified session identifier may be generated using a built in random number generator at the data center, a proprietary component (e.g., a third-party database), or any other unique number generator. The global unified session identifier may be designated at the first data center for which a user accesses. For example, the very first unique session identifier generated for a user in a given data center (e.g., data center 310) may be designated as the global unified session identifier across multiple data centers within the MDC enterprise network. When a user requests a second resource and the request hops to a second data center (e.g., data center 314), the data center specific unique identifier generation service within the second data center may be used to generate a unique session ID for the user. In addition, the second data center may associate the designated global unified session identifier with the newly generated local session identifier through an indexed attribute. Since all the sessions created for a user on all data centers are mapped to a single global unified session identifier in this embodiment, the global unified session identifier will be the only mechanism that can be used to implement various global session actions. For example, the global unified session identifier can be used to selectively terminate all related user sessions across the data centers.

Accordingly, in certain embodiments, a client browser or a mobile application provides a cookie to an access manager server session management engine (SME) which validates the cookie. The cookie might contain a session reference. If the session reference is present, then the SME retrieves the session from a session store and validates it. If the session is valid and the constraints are satisfied, then the SME can aloe the client browser or mobile application access.

As alluded to above, a session store can be a distributed store that is distributed across a cluster of access manager servers. SME can manage data in client side sessions (cookies) and server side sessions based on requirements and policies set by administrator users.

Technical details of client-side cookie session tracking and their transfer to server-side cookie session tracking may dictate different designs over others.

Cookie based session management can use cookies to persist the session information at the client side with various options. An access manager global inactivity time out (GITO) cookie can be introduced to track the inactivity timeouts.

Cookie based session management can use the following cookies to handle the session.
1. access manager ID cookie
This cookie can be the source of truth for access manager front channel authentication using HTTP (hyper text transfer protocol).
2. access manager GITO cookie
This timeout cookie may contain the last access time details to calculate the inactivity timeout. This cookie can be a domain cookie and will be set by agents.
3. ObSSO cookie
This access manager agent cookie can store minimal session information including last access time values.
4. access manager AuthnCookie
This access manager agent cookie can store the minimal session information. Webgate changes may be required to update the AuthnCookie during authorization.

Cookie based session management can use the following cookies to handle session validity, session expiry, and session inactivity timeout. The cookies will have minimal session data that can be used to recreate a session at server side to do the all the required server side operations. This can be configured with a server side cache that will be used in case an application needs to store more data in a session that cannot be handled by the cookie. The cache may be used only if required.

During authentication, an access manager ID cookie and an access manager GITO cookie will be set. The access manager ID cookie will be source of truth. The GITO cookie can be used for an inactivity time out calculation. During authorization along with the updated ObSSO cookie or AuthnCookie, the access manager GITO cookie can also be set. This cookie can be a domain cookie and can be set as a response cookie during authorization. Any authentication request to an access manager server can contain the access manager GITO cookie to evaluate the session validity.

Figure 4:
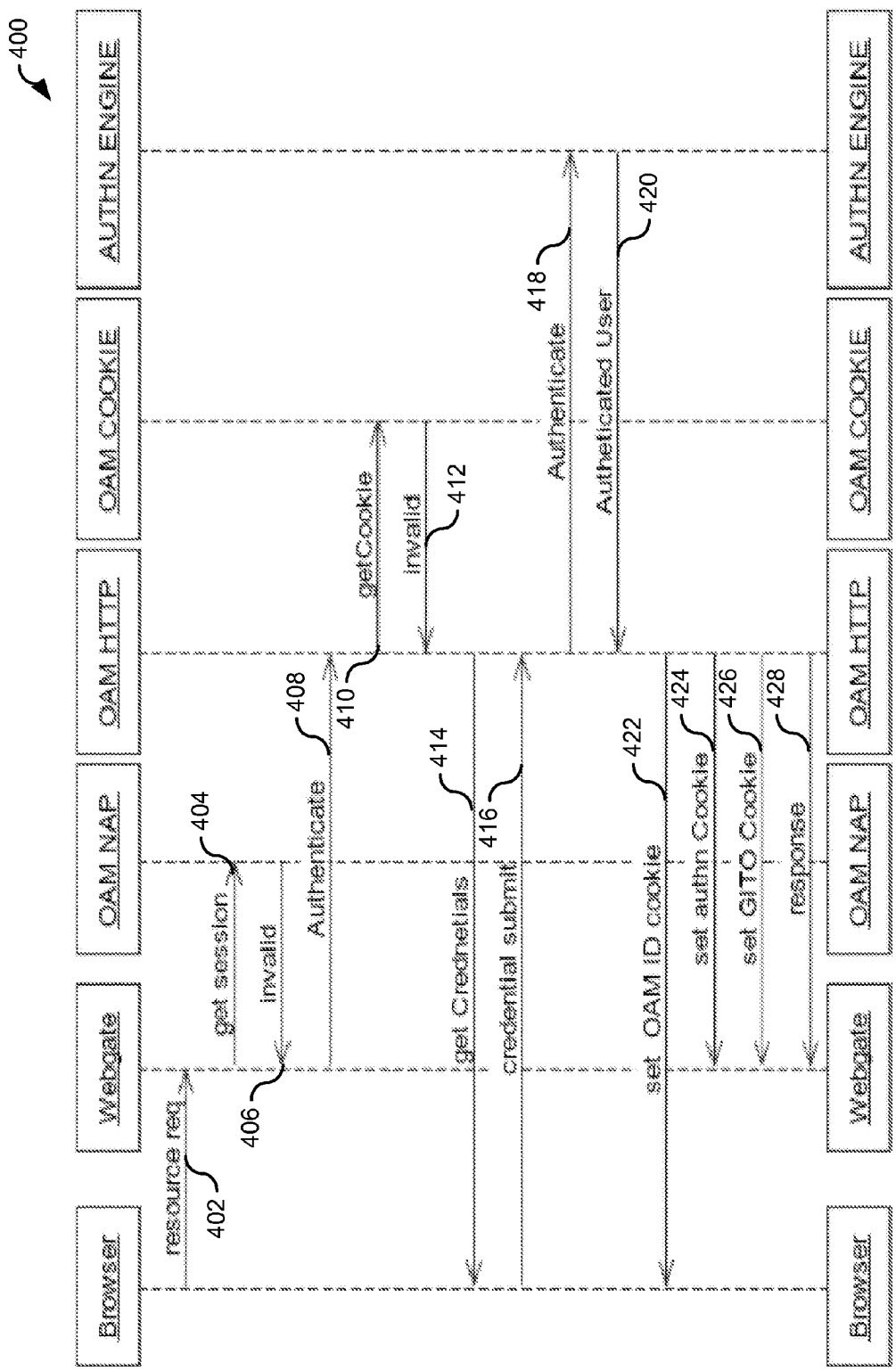
FIG. 4 illustrates an authentication sequence in accordance with an embodiment.

FIG. 4 illustrates authentication sequence 400 in accordance with an embodiment. During an authentication request, a browser (e.g., of client device 302 of FIG. 3) sends resource request to an access manager server (e.g., access manager 304) in step 402. In step 404, 406, 408, and 410, the access manager checks for an access manager ID cookie to see if the user is already authenticated and flowed by an access manager GITO cookie. The access manager GITO cookie will have the inactivity timeout values. The values from this cookie are used to find out whether the session is timed out or not. If both access manager ID and access manager GITO cookies are valid, then the session can be declared valid. If the access manager ID cookie is valid and the access manager GITO cookie is invalid in step 412, then the session is considered as time out and the authentication process starts as illustrated in steps 414, 416, 418, 420, 422, 424, 426, and 428. Also if the access manager ID cookie is invalid, then the authentication process starts.

Figure 5:
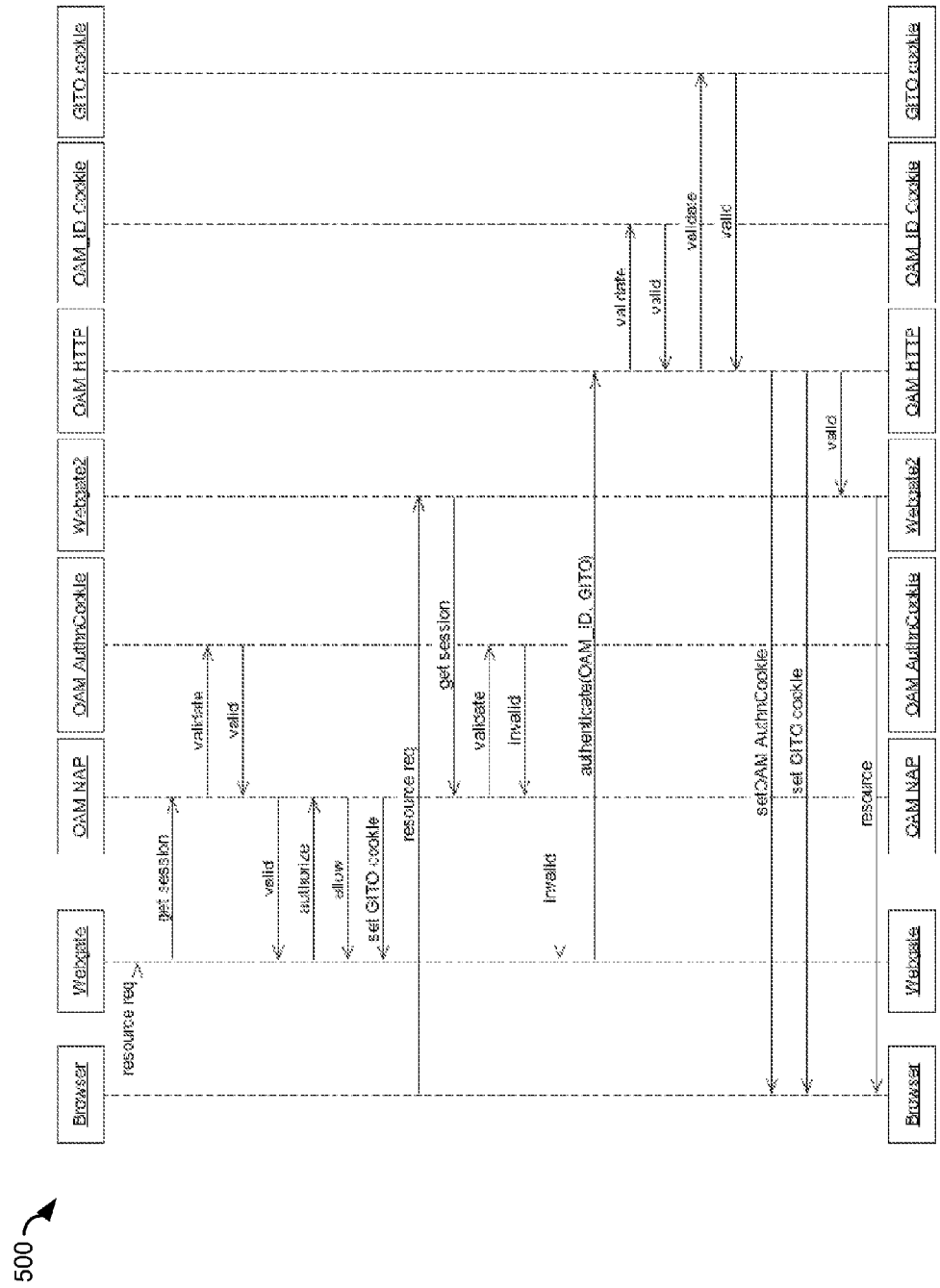
FIG. 5 illustrates an authenticate and authorization sequence in accordance with an embodiment.

FIG. 5 illustrates authenticate and authorization sequence 500 in accordance with an embodiment. During an authorization request, an access manager server checks for the agent cookie. If the agent cookie is a previous version of the enterprise software, then the agent cookie (e.g., ObssoCookie) can contain the session identifier. The timeout details of the session can be validated using this cookie alone. No access manager ID cookie or access manager GITO cookie is expected during an authorization request. If the ObssoCookie is valid, then the server can set a updated access manager GITO cookie and ObssoCookie. If the ObSSO cookie is invalid, then the request will come to the access manager server for front channel authentication.

CONCLUSION

Figure 6:
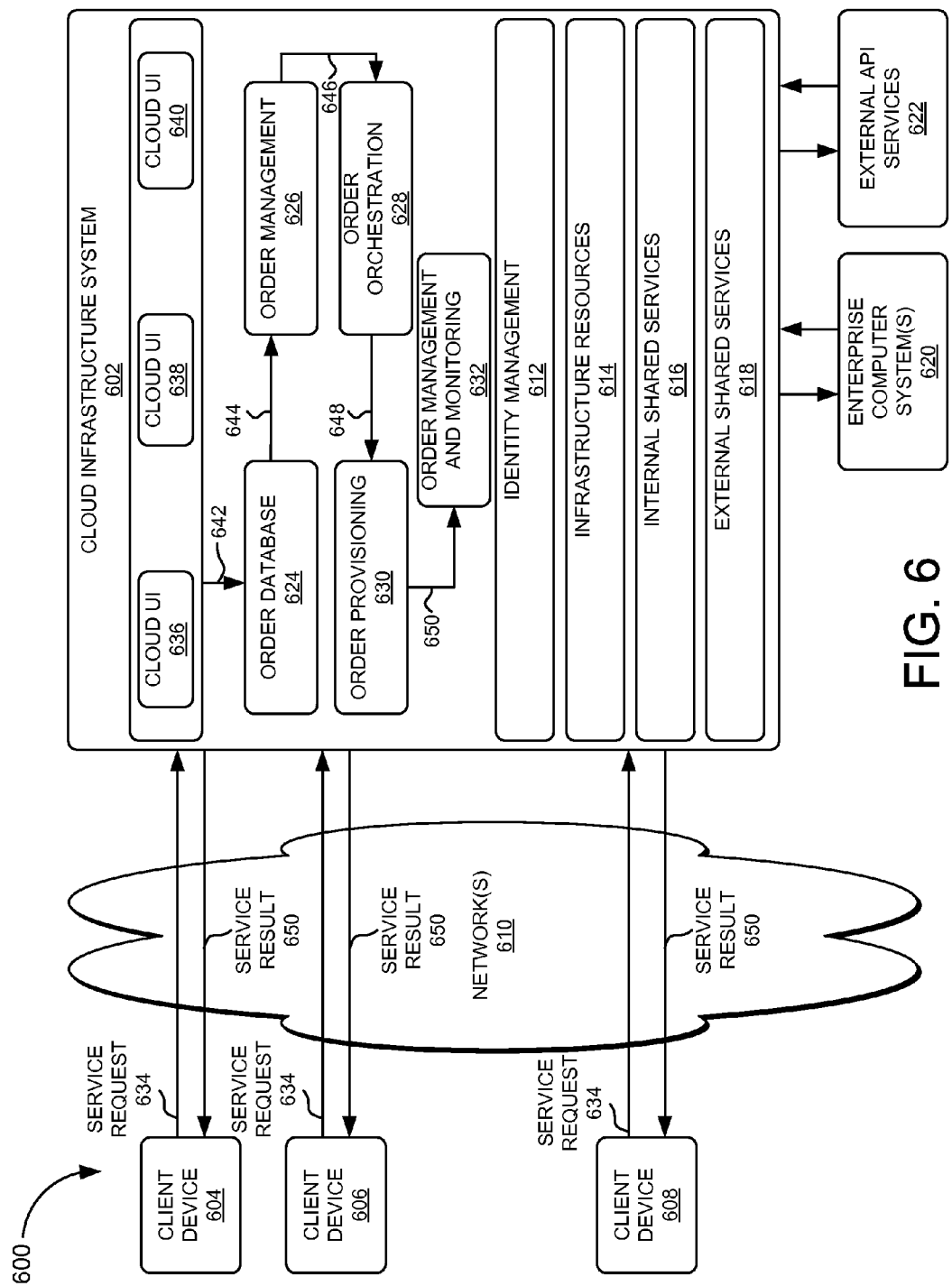
FIG. 6 is a simplified block diagram of components of a system environment by which services provided by the components of an embodiment system may be offered as cloud services, in accordance with an embodiment of the present disclosure.

FIG. 6 is a simplified block diagram of one or more components of system environment 600 by which services provided by one or more components of an embodiment system may be offered as cloud services, in accordance with an embodiment of the present disclosure. In the illustrated embodiment, system environment 600 includes cloud infrastructure system 602 that provides cloud services to one or more client computing devices 604, 606, and 608. Client computing devices 604, 606, and 608 may be used by users to interact with cloud infrastructure system 602. Client computing devices 604, 606, and 608 may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in FIG. 6 may have other components than those depicted. Further, the embodiment shown in FIG. 6 is only one example of a cloud infrastructure system that may incorporate an embodiment of the invention. In some other embodiments, cloud infrastructure system 602 may have more or fewer components than shown in FIG. 6, may combine two or more components, or may have a different configuration or arrangement of components.

Client computing devices 604, 606, and 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 604, 606, and 608 can be general purpose personal computers including, by way of example, personal computers and/or laptop computers running various versions of Microsoft Windows®, Apple Macintosh®, and/or Linux operating systems. Client computing devices 604, 606, and 608 can be workstation computers running any of a variety of commercially-available UNIX® or UNIX-like operating systems, including without limitation the variety of GNU/Linux operating systems, such as for example, Google Chrome OS. Alternatively, or in addition, Client computing devices 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Network(s) 610 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Cloud infrastructure system 602 may comprise one or more computers and/or servers. These computer systems or servers may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, one or more computer systems or servers associated with cloud infrastructure system 602 may be adapted to run one or more services or software applications described in the foregoing disclosure. For example, one or more computer systems or servers associated with cloud infrastructure system 602 may correspond to a server for performing processing described herein according to an embodiment of the present disclosure.

One or more computer systems or servers associated with cloud infrastructure system 602 may run an operating system including any of those discussed above, as well as any commercially available server operating system. One or more computer systems or servers associated with cloud infrastructure system 602 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In certain embodiments, services provided by cloud infrastructure system 602 may include a host of services that are made available to users of cloud infrastructure system 602 on demand, such as online data storage and backup solutions, Web-based e-mail services, hosted office suites and document collaboration services, database processing, managed technical support services, and the like. Services provided by cloud infrastructure system 602 can dynamically scale to meet the needs of its users. A specific instantiation of a service provided by cloud infrastructure system 602 is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service instance instantiated by cloud infrastructure 602 may include protected computer network access to storage, a hosted database, a hosted web server, a software application, or other service provided by a cloud vendor to a user, or as otherwise known in the art. For example, a service instance instantiated by cloud infrastructure 602 can include password-protected access to remote storage on the cloud through the Internet. As another example, a service instance instantiated by cloud infrastructure 602 can include a web service-based hosted relational database and a script-language middleware engine for private use by a networked developer. As another example, a service instance instantiated by cloud infrastructure 602 can include access to an email software application hosted on a cloud vendor's web site.

In certain embodiments, cloud infrastructure system 602 may include a suite of applications, middleware, development service, and database service offerings that are delivered to a customer in a self-service, subscription-based, elastically scalable, reliable, highly available, and secure manner. An example of such a cloud infrastructure system as embodied in cloud infrastructure service 602 is the Oracle Public Cloud provided by the present assignee.

Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. In some embodiments, the services provided by cloud infrastructure system 602 may include, without limitation, application services, platform services and infrastructure services. In some examples, application services may be provided by cloud infrastructure system 602 via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 602 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 602 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by cloud infrastructure system 602 and also control the deployed services. In some embodiments, platform services provided by cloud infrastructure system 602 may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in cloud infrastructure system 602. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 600 may include identity management module 612. Identity management module 612 may be configured to provide identity services, such as access management and authorization services in cloud infrastructure system 602. In some embodiments, identity management module 612 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 612 may also include the management of descriptive information about each customer and about how and by whom that descriptive information can be accessed and modified.

In certain embodiments, cloud infrastructure system 602 may also include infrastructure resources 614 for providing the resources used to provide various services to customers of cloud infrastructure system 602. In one embodiment, infrastructure resources 614 may include pre-integrated and optimized combinations of hardware, such as servers, storage, and networking resources to execute the services provided by the PaaS platform and the SaaS platform.

In some embodiments, resources in cloud infrastructure system 602 may be shared by multiple users and dynamically re-allocated per demand. Additionally, resources may be allocated to users in different time zones. For example, cloud infrastructure system 602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 616 may be provided that are shared by different components or modules of cloud infrastructure system 602 and by the services provided by cloud infrastructure system 602. These internal shared services 616 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, a number of external shared services 618 may be provided that are shared by different components or modules of cloud infrastructure system 602 and by the services provided by cloud infrastructure system 602. These external shared services 618 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various embodiments, external shared services 618 may include one or more components that provide access, data transformation, automation, or the like to enterprise computer system(s) 620. Access to enterprise computer system(s) 620 may be shared by different components or modules of cloud infrastructure system 602 and by the services provided by cloud infrastructure system 602. In some embodiments, access to enterprise computer system(s) 620 may be shared by service instances provided by cloud infrastructure system 602 that are restricted to one or more subscribers.

In further embodiments, external shared services 618 may include external application programming interface (API) services 622 that are shared by different components or modules of cloud infrastructure system 602 and by the services provided by cloud infrastructure system 602. These external API services 622 may include, without limitation, APIs provided by other third party services or entities.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like. In various embodiments, cloud infrastructure system 602 may be adapted to automatically provision, manage and track a customer's subscription to services offered by cloud infrastructure system 602. A customer, via a subscription order, may order one or more services provided by cloud infrastructure system 602. Cloud infrastructure system 602 then performs processing to provide the services in the customer's subscription order.

In one embodiment, as depicted in FIG. 6, cloud management functionality may be provided by one or more modules, such as order database module 624, order management module 626, order orchestration module 628, order provisioning module 630, and order management and monitoring module 632. These modules may include or be provided using one or more computers and/or servers, which may be general purpose computers, specialized server computers, server farms, server clusters, or any other appropriate arrangement and/or combination.

In exemplary operation, a customer using a client device, such as one or more of client computing devices 604, 606 or 608, may interact with cloud infrastructure system 602 by requesting one or more services provided by cloud infrastructure system 602. The customer may issue service request 634 cloud infrastructure system 602 using a variety of means. Service request 634 may include placing an order for a subscription for one or more services offered by cloud infrastructure system 602, accessing one or more services offered by cloud infrastructure system 602, or the like. In certain embodiments, the customer may access a cloud User Interface (UI), cloud UI 636, cloud UI 638 and/or cloud UI 640 and place a subscription order via these UIs. The order information received by cloud infrastructure system 602 in response to the customer placing an order may include information identifying the customer and information identifying one or more services offered by the cloud infrastructure system 602 to which the customer intends to subscribe. After an order has been placed by the customer, the order information is received via the cloud UIs, 636, 638 and/or 640.

In this example, information 42 is sent to order database 624 to have the order placed by the customer stored in order database 624. Order database 624 can be one of several databases operated by cloud infrastructure system 602 and operated in conjunction with other system elements. Information 44 can be forwarded to order management module 626 that includes all or part of the order information stored in order database 24. In some instances, order management module 626 may be configured to perform billing and accounting functions related to the order, such as verifying the order, and upon verification, booking the order.

Information 646 including all or part of the order information can be communicated to order orchestration module 628. Order orchestration module 628 may utilize order information to orchestrate the provisioning of services and resources for the order placed by the customer. In some instances, order orchestration module 628 may orchestrate the provisioning of resources to support the subscribed services using the services of order provisioning module 630.

In certain embodiments, order orchestration module 628 enables the management of business processes associated with each order and applies business logic to determine whether an order should proceed to provisioning. Upon receiving an order for a new subscription, order orchestration module 628 sends request 648 to order provisioning module 630 to allocate resources and configure those resources needed to fulfill the subscription order. Order provisioning module 630 enables the allocation of resources for the services ordered by the customer. Order provisioning module 630 provides a level of abstraction between the cloud services provided by cloud infrastructure system 602 and the physical implementation layer that is used to provision the resources for providing the requested services. Order orchestration module 628 may thus be isolated from implementation details, such as whether or not services and resources are actually provisioned on the fly or pre-provisioned and only allocated/assigned upon request.

A customer's subscription order may be managed and tracked by order management and monitoring module 632. In some instances, order management and monitoring module 632 may receive information 650 indicative of any provisioned services and/or resources associated with the customer. Order management and monitoring module 632 be configured to collect usage statistics for the services in the subscription order, such as the amount of storage used, the amount data transferred, the number of users, and the amount of system up time and system down time.

Once services and resources are provisioned in the above example, service result 652 may be sent to customers on client computing devices 604, 606, and/or 608 informing the customer of the provided services and/or resources. In instances where service request 634 includes a request to access a service or have a service perform one or more operations, service result 652 may be send to customers on client computing devices 604, 606, and/or 608 providing the requested access or results of any operations, services performed, or data requested.

Figure 7:
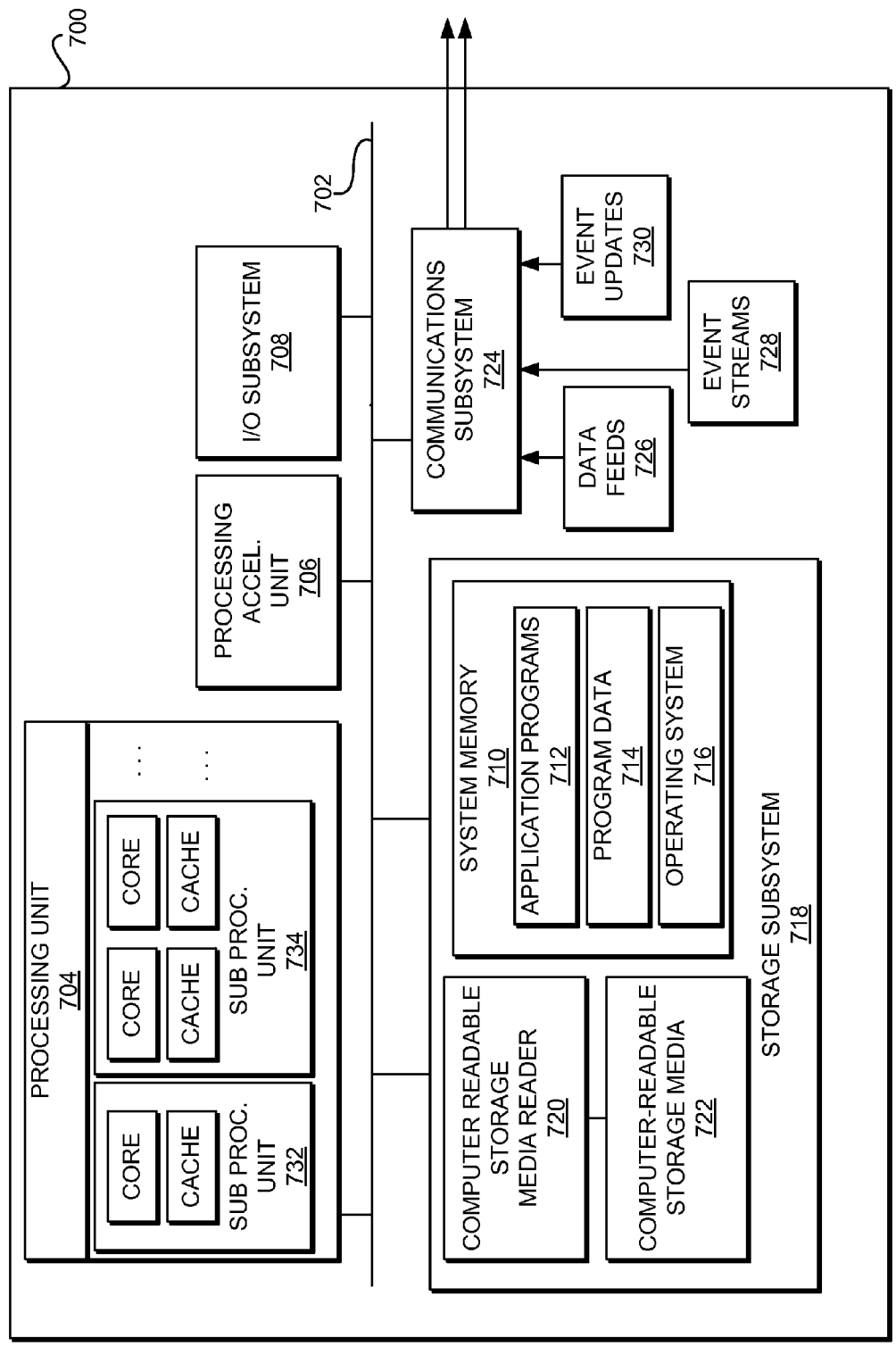
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above. As shown in FIG. 7, computer system 700 includes bus subsystem 702 and processing unit 704 that communicates with a number of peripheral subsystems via bus subsystem 702. These peripheral subsystems may include processing acceleration unit 706, I/O subsystem 708, storage subsystem 718, and communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for managing sessions in an enterprise environment, the method comprising:
    based on authenticating a client device to access a first application in a computing environment, generating, by a computer system of an access management system, a session cookie that enables the client device to access a feature of a first application in the computing environment, wherein access to the feature of the first application is enabled without establishing a server-based session for the client device in the computing environment;
    sending the session cookie to the client device, wherein the client device stores the session cookie to enable the client device to access the feature of the first application;
    receiving, at the computer system, a request for the client device to access a feature of a second application in the computing environment;
    determining, with one or more processors associated with the computer system, whether access to the feature of the second application is dependent on establishing a server-side session for the client device in the computing environment;
    based on determining that the client device is authenticated to access the second application according to the session cookie and based on determining that access to the feature of the second application is dependent on establishing the server-side session for the client device in the computing environment, instantiating, with the one or more processors associated with the computer system, a server-side session object to establish the server-side session for the client device in the computing environment, wherein the server-side session object enables the client device to access the feature of the second application in the computing environment;
    updating, with the one or more processors associated with the computer system, the server-side session object to include an identifier associated with the session cookie that is stored on the client device;
    generating with the one or more processors associated with the computer system, a response to the request based on enabling access to the feature of the second application using the server-side session object; and
    sending the response to the client device.

2. The method of claim 1 wherein determining whether access to the feature of the second application is dependent on establishing the server-side session for the client device in the computing environment comprises determining whether access to the feature of the second application is controlled based on an configurable policy.

3. The method of claim 2 wherein the configurable policy includes a security policy.

4. The method of claim 2 wherein the configurable policy includes a resource usage policy.

5. The method of claim 1 wherein determining whether access to the feature of the second application is dependent on establishing the server-side session for the client device in the computing environment comprises determining that access to the feature of the second application is based on a limit of concurrent users accessing the feature of the second application.

6. The method of claim 1 wherein determining whether access to the feature of the second application is dependent on establishing the server-side session for the client device in the computing environment comprises determining that access to the feature of the second application is based on a time limit on a session for accessing the feature of the second application.

7. The method of claim 1 wherein determining whether access to the feature of the second application is dependent on establishing the server-side session for the client device in the computing environment comprises determining that access to the feature of the second application is based on an amount of data to be stored for the feature of the second application and an amount of memory available on the client device.

8. The method of claim 1 further comprising:
    updating, with the one or more processors associated with the computer system, the server-side session object with state information associated with the feature of the second application.

9. A non-transitory computer-readable medium storing a computer program product which, when executed by a processor of a computer system, causes the processor to:
    based on authenticating a client device to access a first application in a computing environment, generate, by an access management system, a session cookie that enables the client device to access a feature of a first application in a computing environment, wherein access to the feature of the first application is enabled without establishing a server-based session for the client device in the computing environment;

send the session cookie to the client device, wherein the client device stores the session cookie to enable the client device to access the feature of the first application;

receive a request for the client device to access a feature of a second application in the computing environment;

determine whether access to the feature of the second application is dependent on establishing a server-side session for the client device in the computing environment;

based on determining that the client device is authenticated to access the second application according to the session cookie and based on determining that access to the feature of the second application is dependent on establishing the server-side session for the client device in the computing environment, instantiate a server-side session object to establish the server-side session for the client device in the computing environment, wherein the server-side session object enables the client device to access the feature of the second application in the computing environment;

update the server-side session object to include an identifier associated with the session cookie that is stored on the client device;

generate a response to the request based on enabling access to the feature of the second application using the server-side session object; and send the response to the client device.

10. The non-transitory computer-readable medium of claim 9 wherein determining whether access to the feature of the second application is dependent on establishing the server-side session for the client device in the computing environment includes determining whether access to the feature of the second application is controlled based on a configurable policy.

11. The non-transitory computer-readable medium of claim 10 wherein the configurable policy includes a security policy.

12. The non-transitory computer-readable medium of claim 10 wherein the configurable policy includes a resource usage policy.

13. The non-transitory computer-readable medium of claim 9 wherein determining whether access to the feature of the second application is dependent on establishing the server-side session for the client device in the computing environment includes determining that access to the feature of the second application is based on a limit of concurrent users accessing the feature of the second application.

14. The non-transitory computer-readable medium of claim 9 wherein determining whether access to the feature of the second application is dependent on establishing the server-side session for the client device in the computing environment includes determining that access to the feature of the second application is based on a time limit on a session for accessing the feature of the second application.

15. The non-transitory computer-readable medium of claim 9 wherein determining whether access to the feature of the second application is dependent on establishing the server-side session for the client device in the computing environment includes determining that access to the feature of the second application is based on an amount of data to be stored for the feature of the second application and an amount of memory available on the client device.

16. The non-transitory computer-readable medium of claim 9 wherein the computer program product, when executed by the processor, further causes the processor to:

update the server-side session object with state information associated with the feature of the second application.

17. A system comprising:

a hardware processor; and a memory storing a set of instructions, which when executed by the hardware processor, causes the hardware processor to:

based on authenticating a client device to access a first application in a computing environment, generate, by an access management system, a session cookie that enables the client device to access a feature of a first application in a computing environment, wherein access to the feature of the first application is enabled without establishing a server-based session for the client device in the computing environment;

send the session cookie to the client device, wherein the client device stores the session cookie to enable the client device to access the feature of the first application;

receive a request for the client device to access a feature of a second application in the computing environment;

determine whether access to the feature of the second application is dependent on establishing a server-side session for the client device in the computing environment;

based on determining that the client device is authenticated to access the second application according to the session cookie and based on determining that access to the feature of the second application is dependent on establishing the server-side session for the client device in the computing environment, instantiate a server-side session object to establish the server-side session for the client device in the computing environment, wherein the server-side session object enables the client device to access the feature of the second application in the computing environment;

update the server-side session object to include an identifier associated with the session cookie that is stored on the client device;

generate a response to the request based on enabling access to the feature of the second application using the server-side session object; and send the response to the client device.

18. The method of claim 1 further comprising:

receiving, from the client device, authentication credential information to determine access to the feature of the first application, wherein the authentication credential information is stored in the session cookie on the client device; and determining, based on the authentication credential information, authentication to access the feature of the first application.

19. The method of claim 18, wherein instantiating the server-side session object includes updating the server-side session object to include the authentication credential information stored in the session cookie.

20. The method of claim 1, wherein the feature of the first application is different from the feature of the second application.

* * * * *

UNITED STATES PATENT AND TRADEMARK OFFICE
CERTIFICATE OF CORRECTION

PATENT NO. : 9,866,640 B2  
APPLICATION NO. : 14/491076  
DATED : January 9, 2018  
INVENTOR(S) : Motukuru et al.

Page 1 of 1

It is certified that error appears in the above-identified patent and that said Letters Patent is hereby corrected as shown below:

In the Specification

In Column 2, Line 16, delete "art" and insert -- art. --, therefor.

In Column 14, Line 36, delete "(hyper text" and insert -- (hypertext --, therefor.

Signed and Sealed this  
Twenty-fourth Day of July, 2018

Andrei Iancu  
*Director of the United States Patent and Trademark Office*